United States Patent
Wu et al.

(10) Patent No.: US 10,516,987 B2
(45) Date of Patent: Dec. 24, 2019

(54) DISCOVERY METHOD AND DEVICE

(71) Applicant: Huawei Technologies Co., Ltd., Shenzhen (CN)

(72) Inventors: Yizhuang Wu, Beijing (CN); Yanmei Yang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/812,859

(22) Filed: Nov. 14, 2017

(65) Prior Publication Data

US 2018/0070223 A1    Mar. 8, 2018

Related U.S. Application Data (63) Continuation of application No. PCT/CN2015/079118, filed on May 15, 2015.

(51) Int. Cl.
*H04W 8/00* (2009.01)
*H04W 76/14* (2018.01)
(Continued)

(52) U.S. Cl.
CPC ............ *H04W 8/005* (2013.01); *H04W 4/10* (2013.01); *H04W 8/00* (2013.01);
(Continued)

(58) Field of Classification Search
CPC ....... H04W 8/005; H04W 8/00; H04W 76/14; H04W 72/0406; H04W 84/18;
(Continued)

(56) References Cited

U.S. PATENT DOCUMENTS

2014/0341121 A1    11/2014 Chang et al.
2015/0029866 A1    1/2015 Liao et al.
(Continued)

FOREIGN PATENT DOCUMENTS

CN    102857901 A    1/2013
CN    104066070 A    9/2014
(Continued)

OTHER PUBLICATIONS

"Solution for ProSe Discovery P-CR," SA WG2 Meeting #97, Busan, South Korea, S2-132166 (revision of S2-131967), 3rd Generation Partnership Project, Valbonne, France (May 27-31, 2013).
(Continued)

*Primary Examiner* — Ajay Cattungal
(74) *Attorney, Agent, or Firm* — Leydig, Voit & Mayer, Ltd.

(57) ABSTRACT

The present invention discloses a discovery method and device, and relates to the field of wireless communications technologies, to resolve a problem that existing two communication parties cannot accurately discover each other, and then it cannot be ensured that the two communication parties perform service communication in a Prose manner. The method provided in the present invention includes: sending a discovery message, where the discovery message includes application layer identifier information of a discovery target, and the discovery target is at least one target user or at least one communications group of a first user that uses the first MCPTT UE; and receiving a response message sent by second MCPTT UE, where the response message includes a layer 2 identifier of the second MCPTT UE and an application layer identifier of a user that uses the second MCPTT UE.

20 Claims, 4 Drawing Sheets

(51) Int. Cl.
*H04W 72/04* (2009.01)
*H04W 84/18* (2009.01)
*H04W 92/18* (2009.01)
*H04W 4/10* (2009.01)
H04L 5/00 (2006.01)
H04W 84/08 (2009.01)
H04W 76/45 (2018.01)

(52) U.S. Cl.
CPC ....... *H04W 72/0406* (2013.01); *H04W 76/14* (2018.02); *H04W 84/18* (2013.01); *H04W 92/18* (2013.01); H04L 5/0048 (2013.01); H04W 72/0446 (2013.01); H04W 76/45 (2018.02); H04W 84/08 (2013.01)

(58) Field of Classification Search
CPC ... H04W 92/18; H04W 4/10; H04W 72/0446; H04W 84/08; H04W 76/45; H04L 5/0048
See application file for complete search history.

(56) References Cited

U.S. PATENT DOCUMENTS

| | | | |
|---|---|---|---|
| 2015/0382174 A1 | 12/2015 | Guo et al. | |
| 2016/0007185 A1* | 1/2016 | Zhu | H04W 8/06 455/435.1 |
| 2016/0286471 A1* | 9/2016 | Zisimopoulos | H04W 48/16 |
| 2016/0295496 A1* | 10/2016 | Atarius | H04W 76/14 |
| 2016/0309377 A1* | 10/2016 | Jung | H04W 36/0072 |
| 2016/0323777 A1* | 11/2016 | Pan | H04W 76/14 |
| 2016/0381720 A1* | 12/2016 | Baek | H04W 8/14 370/329 |
| 2017/0245149 A1* | 8/2017 | Yang | H04W 4/08 |
| 2017/0273124 A1* | 9/2017 | Yang | H04W 88/02 |
| 2018/0077633 A1* | 3/2018 | Chae | H04L 5/00 |
| 2018/0124674 A1* | 5/2018 | Vutukuri | H04W 36/30 |

FOREIGN PATENT DOCUMENTS

| | | |
|---|---|---|
| KR | 20140135080 A | 11/2014 |
| WO | 2014139114 A1 | 9/2014 |
| WO | 2014162175 A1 | 10/2014 |

OTHER PUBLICATIONS

"Off-network MCPTT discovery and floor control," 3GPP TSG-SA WG6 Meeting #3, San Jose del Cabo, Mexico, S6-150219 (revision of S6-15xxxx), 3rd Generation Partnership Project, Valbonne, France (Apr. 13-17, 2015).

"3rd Generation Partnership Project; Technical Specification Group Services and System Aspects; Mission Critical Push to Talk (MCPTT) over LTE; Stage 1(Release 13)," 3GPP TS 22.179 V13.1.0,PP. 1-76, 3rd Generation Partnership Project, Valbonne, France (Mar. 2015).

"3rd Generation Partnership Project; Technical Specification Group Services and System Aspects; Proximity-based services (ProSe); Stage 2 (Release 12)," 3GPP TS 23.303 V12.4.0, pp. 1-63, 3rd Generation Partnership Project, Valbonne, France (Mar. 2015).

* cited by examiner

DISCOVERY METHOD AND DEVICE

CROSS-REFERENCE TO RELATED APPLICATIONS

This application is a continuation of International Patent Application No. PCT/CN2015/079118, filed May 15, 2015, the disclosure of which is hereby incorporated by reference in its entirety.

TECHNICAL FIELD

The present invention relates to the field of wireless communications technologies, and in particular, to a discovery method and device.

BACKGROUND

Figure 1:
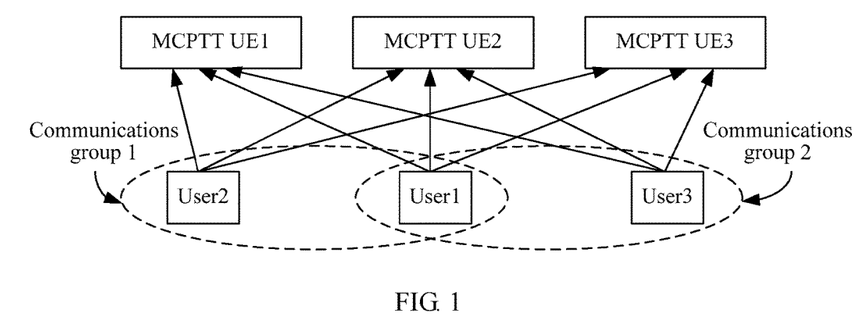
FIG. 1 is a schematic diagram of an existing MCPTT system.

A mission critical push to talk (MCPTT) system can support a direct mode operation (DMO) scenario. For example, TS22.179 defines that MCPTT can support two DMO scenarios: one-to-one communication and private call. In an MCPTT system, a same user may not only be affiliated with multiple communications groups, but also use different MCPTT user equipments (UE) to acquire an MCPTT service. For example, in the MCPTT system shown in FIG. 1, a user 1 is affiliated with a communications group 1 and a communications group 2, and the user 1 may use MCPTT UE 1, MCPTT UE 2, and MCPTT UE 3 to obtain an MCPTT service.

In the MCPTT system, a user may use different MCPTT UEs to acquire an MCPTT service. Therefore, to ensure normal communication, two communication parties in a DMO scenario not only need to learn an application layer identifier, that is, a user identifier (user ID) of each other, but also need to learn a layer 2 identifier (a layer 2 ID), that is, a device identifier of MCPTT UE currently used by each other, so as to accurately identify each other, and then perform service communication in a proximity-based service (Proximity-based Services, Prose for short) manner.

However, in the prior art, when a source user needs to discover at least one target user, the source user generally uses the following discovery method to discover the target user: The source user sends a discovery message that includes a layer 2 identifier of MCPTT UE currently used by the user to the at least one target user, and after receiving the discovery message, the target user returns a response message that includes a layer 2 identifier of MCPTT UE currently used by the target user to the user. The source user cannot identify the target user according to the response message returned by the target user, and therefore the source user cannot perform service communication with the target user in the Prose manner.

SUMMARY

Embodiments of the present invention provide a discovery method and device, to resolve an existing problem that a source user cannot identify a target user according to a response message returned by the target user, and therefore the source user cannot perform service communication with the target user in a Prose manner.

To achieve the foregoing objective, the following technical solutions are adopted in the embodiments of the present invention:

According to a first aspect, an embodiment of the present invention provides a discovery method, applied to first mission critical push to talk MCPTT user equipment UE, where the method includes:

sending a discovery message, where the discovery message includes application layer identifier information of a discovery target, and the discovery target is at least one target user or at least one communications group of a first user that uses the first MCPTT UE; and receiving a response message sent by second MCPTT UE, where the response message includes a layer 2 identifier of the second MCPTT UE and an application layer identifier of a user that uses the second MCPTT UE, where when the discovery target is the at least one target user, the second MCPTT UE is MCPTT UE currently used by any target user of the at least one target user; or when the discovery target is the at least one communications group, the second MCPTT UE is MCPTT UE currently used by a user in any communications group of the at least one communications group.

With reference to the first aspect, in a first implementable manner of the first aspect, the discovery message is an application layer message.

With reference to the first implementable manner of the first aspect, in a second implementable manner of the first aspect, the discovery message is included in user plane data of the first MCPTT UE.

With reference to the first aspect, in a third implementable manner of the first aspect, the discovery message is a control plane signaling message of the first MCPTT UE.

With reference to any one of the first aspect to the third implementable manner of the first aspect, in a fourth implementable manner of the first aspect, the application layer identifier information of the discovery target is encrypted information, and the discovery message further includes a security parameter, where the security parameter is used to enable the second MCPTT UE to acquire, after determining corresponding security information according to the security parameter, an application layer identifier of the discovery target in the discovery message and return the response message.

With reference to any one of the first aspect to the fourth implementable manner of the first aspect, in a fifth implementable manner of the first aspect, when the discovery target is the at least one target user, and a target user of the at least one target user and the first user are in a first communications group, the sending a discovery message includes:

acquiring a group layer 2 address of the first communications group; and sending the discovery message to the group layer 2 address, so that all users in the first communications group except the first user receive the discovery message.

With reference to any one of the first aspect to the fourth implementable manner of the first aspect, in a sixth implementable manner of the first aspect, when the discovery target is the at least one communications group, and the first user is in a second communications group of the at least one communications group, the sending a discovery message includes:

acquiring a group layer 2 address of the second communications group; and sending the discovery message to the group layer 2 address, so that all users in the second communications group except the first user receive the discovery message.

With reference to any one of the first aspect to the sixth implementable manner of the first aspect, in a seventh implementable manner of the first aspect, the discovery message further includes:

a layer 2 identifier of the first MCPTT UE and an application layer identifier of a user that uses the first MCPTT UE.

According to a second aspect, an embodiment of the present invention provides a discovery method, applied to mission critical push to talk MCPTT user equipment UE, where the method includes:

acquiring an application layer identifier of a first user that uses the MCPTT UE; and sending a discovery message, where the discovery message includes the application layer identifier of the first user that uses the MCPTT UE.

With reference to the second aspect, in a first implementable manner of the second aspect, the discovery message is an application layer message.

With reference to the first implementable manner of the second aspect, in a second implementable manner of the second aspect, the discovery message is included in user plane data of the MCPTT UE.

With reference to the second aspect, in a third implementable manner of the second aspect, the discovery message is a control plane signaling message of the MCPTT UE.

With reference to any one of the second aspect to the third implementable manner of the second aspect, in a fourth implementable manner of the second aspect, the sending a discovery message includes:

acquiring a group layer 2 address of a first communications group to which the first user belongs; and sending the discovery message to the group layer 2 address, so that all users in the first communications group except the first user receive the discovery message.

With reference to any one of the second aspect to the fourth implementable manner of the second aspect, in a fifth implementable manner of the second aspect, the application layer identifier of the first user is encrypted, and the discovery message further includes a security parameter, where the security parameter is used to enable another MCPTT UE in the first communications group except the MCPTT UE to acquire, after determining corresponding security information according to the security parameter, the application layer identifier of the first user that uses the MCPTT UE in the discovery message.

With reference to any one of the second aspect to the fifth implementable manner of the second aspect, in a sixth implementable manner of the second aspect, the discovery message further includes:

a layer 2 identifier of the MCPTT UE.

According to a third aspect, an embodiment of the present invention provides mission critical push to talk MCPTT user equipment UE, which is used as first MCPTT UE, including:

a sending unit, configured to send a discovery message, where the discovery message includes application layer identifier information of a discovery target, and the discovery target is at least one target user or at least one communications group of a first user that uses the first MCPTT UE; and a receiving unit, configured to receive a response message sent by second MCPTT UE, where the response message includes a layer 2 identifier of the second MCPTT UE and an application layer identifier of a user that uses the second MCPTT UE, where when the discovery target is the at least one target user, the second MCPTT UE is MCPTT UE currently used by any target user of the at least one target user; or when the discovery target is the at least one communications group, the second MCPTT UE is MCPTT UE currently used by a user in any communications group of the at least one communications group.

With reference to the third aspect, in a first implementable manner of the third aspect, the discovery message is an application layer message.

With reference to the first implementable manner of the third aspect, in a second implementable manner of the third aspect, the discovery message is included in user plane data of the MCPTT UE.

With reference to the third aspect, in a third implementable manner of the third aspect, the discovery message is a control plane signaling message of the MCPTT UE.

With reference to any one of the third aspect to the third implementable manner of the third aspect, in a fourth implementable manner of the third aspect, the application layer identifier information of the discovery target is encrypted information, and the discovery message further includes a security parameter, where the security parameter is used to enable the second MCPTT UE to acquire, after determining corresponding security information according to the security parameter, an application layer identifier of the discovery target in the discovery message and return the response message.

With reference to any one of the third aspect to the fourth implementable manner of the third aspect, in a fifth implementable manner of the third aspect, when the discovery target is the at least one target user, and a target user of the at least one target user and the first user are in a first communications group, the MCPTT UE further includes:

an acquiring unit, configured to acquire a group layer 2 address of the first communications group; and the sending unit is specifically configured to send the discovery message to the group layer 2 address, so that all users in the first communications group except the first user receive the discovery message.

With reference to any one of the third aspect to the fourth implementable manner of the third aspect, in a sixth implementable manner of the third aspect, when the discovery target is the at least one communications group, and the first user is in a second communications group of the at least one communications group, the MCPTT UE further includes:

an acquiring unit, configured to acquire a group layer 2 address of the second communications group; and the sending unit is specifically configured to send the discovery message to the group layer 2 address, so that all users in the second communications group except the first user receive the discovery message.

With reference to any one of the third aspect to the sixth implementable manner of the third aspect, in a seventh implementable manner of the third aspect, the discovery message further includes:

a layer 2 identifier of the MCPTT UE and an application layer identifier of a user that uses the MCPTT UE.

According to a fourth aspect, an embodiment of the present invention provides MCPTT UE, including:

an acquiring unit, configured to acquire an application layer identifier of a first user that uses the MCPTT UE; and a sending unit, configured to send a discovery message, where the discovery message includes the application layer identifier of the first user that uses the MCPTT UE.

With reference to the fourth aspect, in a first implementable manner of the fourth aspect, the discovery message is an application layer message.

With reference to the first implementable manner of the fourth aspect, in a second implementable manner of the fourth aspect, the discovery message is included in user plane data of the MCPTT UE.

With reference to the fourth aspect, in a third implementable manner of the fourth aspect, the discovery message is a control plane signaling message of the MCPTT UE.

With reference to any one of the fourth aspect to the third implementable manner of the fourth aspect, in a fourth implementable manner of the fourth aspect, the acquiring unit is further configured to acquire a group layer 2 address of a first communications group to which the first user belongs; and the sending unit is specifically configured to send the discovery message to the group layer 2 address, so that all users in the first communications group except the first user receive the discovery message.

With reference to any one of the fourth aspect to the fourth implementable manner of the fourth aspect, in a fifth implementable manner of the fourth aspect, the application layer identifier of the first user is encrypted, and the discovery message further includes a security parameter, where the security parameter is used to enable another MCPTT UE in the first communications group except the MCPTT UE to acquire, after determining corresponding security information according to the security parameter, the application layer identifier of the first user that uses the MCPTT UE in the discovery message.

With reference to any one of the fourth aspect to the fifth implementable manner of the fourth aspect, in a sixth implementable manner of the fourth aspect, the discovery message further includes:

a layer 2 identifier of the MCPTT UE.

According to a fifth aspect, an embodiment of the present invention provides mission critical push to talk user equipment MCPTT UE, including:

a communications unit, configured to send a discovery message, where the discovery message includes application layer identifier information of a discovery target, and the discovery target is at least one target user or at least one communications group of a first user that uses first MCPTT UE; and receive a response message sent by second MCPTT UE, where the response message includes a layer 2 identifier of the second MCPTT UE and an application layer identifier of a user that uses the second MCPTT UE, where when the discovery target is the at least one target user, the second MCPTT UE is MCPTT UE currently used by any target user of the at least one target user; or when the discovery target is the at least one communications group, the second MCPTT UE is MCPTT UE currently used by a user in any communications group of the at least one communications group.

With reference to the fifth aspect, in a first implementable manner of the fifth aspect, the discovery message is an application layer message.

With reference to the first implementable manner of the fifth aspect, in a second implementable manner of the fifth aspect, the discovery message is included in user plane data of the MCPTT UE.

With reference to the fifth aspect, in a third implementable manner of the fifth aspect, the discovery message is a control plane signaling message of the MCPTT UE.

With reference to any one of the fifth aspect to the third implementable manner of the fifth aspect, in a fourth implementable manner of the fifth aspect, the application layer identifier information of the discovery target is encrypted information, and the discovery message further includes a security parameter, where the security parameter is used to enable the second MCPTT UE to acquire, after determining corresponding security information according to the security parameter, an application layer identifier of the discovery target in the discovery message and return the response message.

With reference to any one of the fifth aspect to the fourth implementable manner of the fifth aspect, in a fifth implementable manner of the fifth aspect, when the discovery target is the at least one target user, and a target user of the at least one target user and the first user are in a first communications group, the MCPTT UE further includes:

a processor, configured to acquire a group layer 2 address of the first communications group; and the communications unit is specifically configured to send the discovery message to the group layer 2 address, so that all users in the first communications group except the first user receive the discovery message.

With reference to any one of the fifth aspect to the fourth implementable manner of the fifth aspect, in a sixth implementable manner of the fifth aspect, when the discovery target is the at least one communications group, and the first user is in a second communications group of the at least one communications group, the MCPTT UE further includes:

an acquiring unit, configured to acquire a group layer 2 address of the second communications group; and the communications unit is specifically configured to send the discovery message to the group layer 2 address, so that all users in the second communications group except the first user receive the discovery message.

With reference to any one of the fifth aspect to the sixth implementable manner of the fifth aspect, in a seventh implementable manner of the fifth aspect, the discovery message further includes:

a layer 2 identifier of the MCPTT UE and an application layer identifier of a user that uses the MCPTT UE.

According to a sixth aspect, an embodiment of the present invention provides MCPTT UE, including:

a processor, configured to acquire an application layer identifier of a first user that uses the MCPTT UE; and a communications unit, configured to send a discovery message, where the discovery message includes the application layer identifier of the first user that uses the MCPTT UE.

With reference to the sixth aspect, in a first implementable manner of the sixth aspect, the discovery message is an application layer message.

With reference to the first implementable manner of the sixth aspect, in a second implementable manner of the sixth aspect, the discovery message is included in user plane data of the MCPTT UE.

With reference to the sixth aspect, in a third implementable manner of the sixth aspect, the discovery message is a control plane signaling message of the MCPTT UE.

With reference to any one of the sixth aspect to the third implementable manner of the sixth aspect, in a fourth implementable manner of the sixth aspect, the processor is further configured to acquire a group layer 2 address of a first communications group to which the first user belongs; and the communications unit is specifically configured to send the discovery message to the group layer 2 address, so that all users in the first communications group except the first user receive the discovery message.

With reference to any one of the sixth aspect to the fourth implementable manner of the sixth aspect, in a fifth implementable manner of the sixth aspect, the application layer identifier of the first user is encrypted, and the discovery message further includes a security parameter, where the security parameter is used to enable another MCPTT UE in the first communications group except the MCPTT UE to acquire, after determining corresponding security information according to the security parameter, the application layer identifier of the first user that uses the MCPTT UE in the discovery message.

With reference to any one of the sixth aspect to the fifth implementable manner of the sixth aspect, in a sixth implementable manner of the sixth aspect, the discovery message further includes:

a layer 2 identifier of the MCPTT UE.

It can be known from the foregoing that, the embodiments of the present invention provide a discovery method and device. First MCPTT UE sends a discovery message that includes identifier information of a discovery target, and receives a response message that is sent by at least one second MCPTT UE and that includes a layer 2 identifier of the second MCPTT UE and an application layer identifier of a user that uses the second MCPTT UE. The response message includes a layer 2 identifier of MCPTT UE and an application layer identifier of a user that uses the MCPTT UE, and therefore a transmit end not only can determine a layer 2 identifier of MCPTT UE used by a peer end, but also can further determine the user that uses the MCPTT UE; and then can accurately identify the peer end, and perform service communication in a Prose manner, which prevents an existing problem that a source user cannot identify a target user according to a response message returned by the target user, and therefore the source user cannot perform service communication with the target user in the Prose manner.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

Embodiment 1

Figure 2:
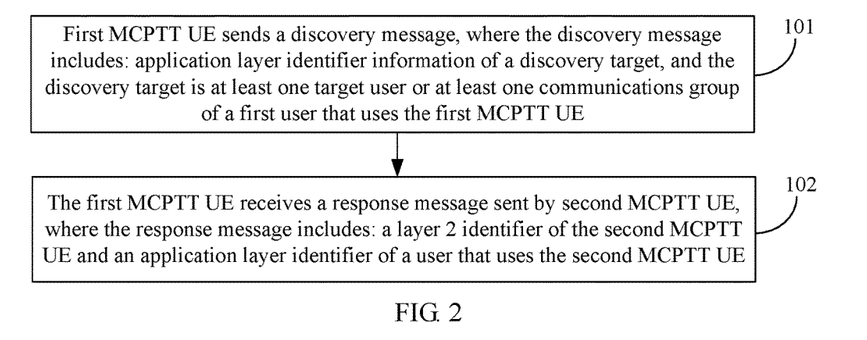
FIG. 2 is a flowchart of a discovery method according to an embodiment of the present invention.

FIG. 2 shows a flowchart of a discovery method according to an embodiment of the present invention. The discovery method is applied to first MCPTT UE in a MCPTT system (for example, a public security system, or a firefighting system), so that a user of the first MCPTT UE discovers some other users or some communications groups that are around the user, where the first MCPTT UE may be any user equipment in the MCPTT system, which is not limited herein. As shown in FIG. 2, the method may include:

101: First MCPTT UE sends a discovery message, where the discovery message includes application layer identifier information of a discovery target, and the discovery target is at least one target user or at least one communications group of a first user that uses the first MCPTT UE.

The discovery target may be some target users or some communications groups that the first user that uses the first MCPTT UE determines to discover. The target user may be any user that uses MCPTT UE to acquire an MCPTT service, may be in a same communications group together with the first user that uses the first MCPTT UE, or may be in a communications group that is different from that of the first user that uses the first MCPTT UE, which is not limited herein. The application layer identifier information of the target user is used to identify the target user, may be an external identifier defined in the 3rd Generation Partnership Project (English: 3rd generation partnership project, 3GPP for short), for example, a mobile subscriber international ISDN/PSTN number (English: Mobile Subscriber International ISDN/PSTN number, MSISDN for short), where an ISDN is an integrated service digital network, and is short for the integrated service digital network, and a PSTN is a public switched telephone network, and is short for the public switched telephone network, or may be a Session Initiation Protocol uniform resource identifier (Session Initiation Protocol, Uniform resource Identity, SIP URI). The communications group may be any communications group in the MCPTT system. Application layer identifier information of the communications group may be a group identifier of the communications group, or may be an application layer group identifier, and is used to identify a group name that is of the communications group and that is in the MCPTT system. For example, a firefighting department includes three communications groups: a communications group 1, a communications group 2, and a communications group 3, where a group identifier of the communications group 1 is an emergency group, a group identifier of the communications group 2 is a leader group, and a group identifier of the communications group 3 is a service group.

Figure 3:
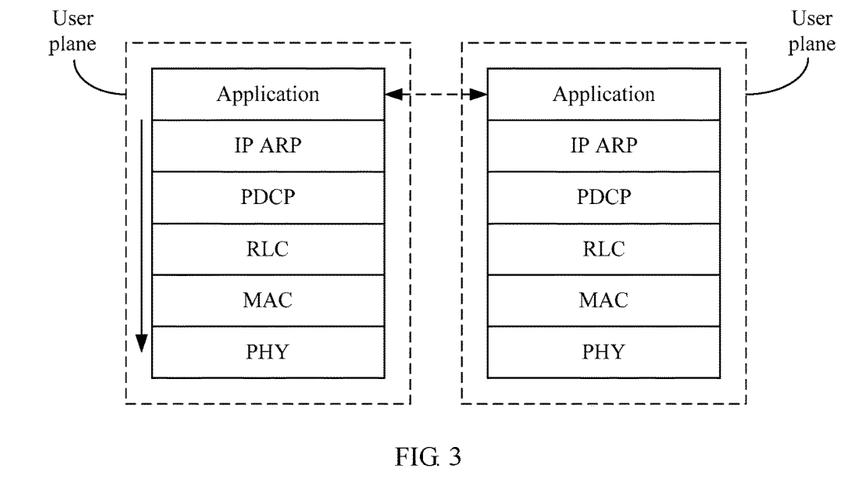
FIG. 3 is a schematic diagram of a user plane according to an embodiment of the present invention.
Figure 4:
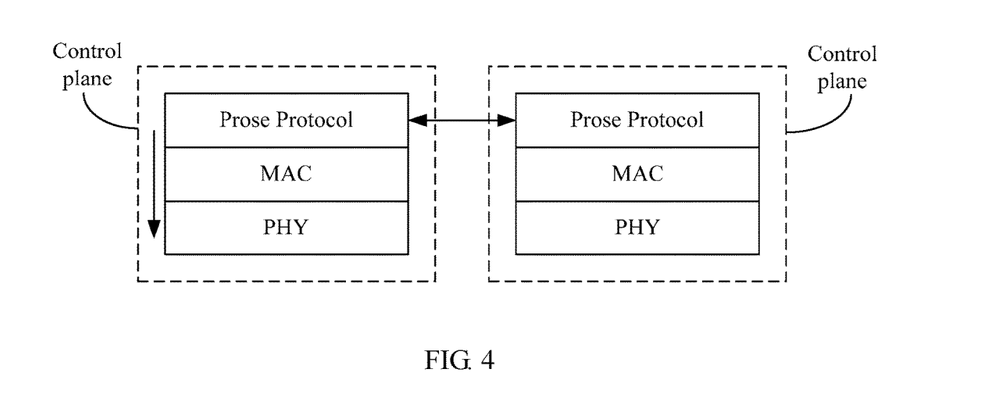
FIG. 4 is a schematic diagram of a control plane according to an embodiment of the present invention.

In the MCPTT system, direct communication may be performed in a one-to-many manner between different MCPTT UEs that are not in a connected state, a user plane channel may be established to perform service communication, or a message may be transmitted by using a control plane channel, where as shown in FIG. 3, a user plane includes six layers successively from the top down (a direction shown by the arrow in FIG. 3): an application layer, an Internet Protocol (Internet Protocol, IP) Address Resolution Protocol (ARP) layer, a Packet Data Convergence Protocol (PDCP) layer, a Radio Link Control (RLC) layer, a Media Access Control (MAC) layer, and a physical (PHY) layer. The application layer may be referred to as a higher layer. One or more layers below the application layer may be referred to as lower layers. Generally, in the user plane, for a lower layer, all control plane messages or data of the application layer are included, as a payload, in a data packet. After initiating a message, the application layer transmits the message to a lower layer, the lower layer performs corresponding processing (such as encapsulation or forwarding), and sends the message to a lower layer of a peer device, and then the lower layer of the peer device performs corresponding processing (such as receiving or decapsulation), and transmits the message to the application layer. As shown in FIG. 4, the control plane may include three layers successively from the top down (a direction shown by the arrow in FIG. 4): a Proximity-based Services Protocol (Protocol for short) layer, an MAC layer, and a PHY layer. Therefore, in this embodiment of the present invention, the discovery message in step 101 may also be used as an application layer message, and sent by being included in user plane data, or may be sent as a control plane signaling message.

When the discovery message is an application layer message, and is sent by being included in user plane data, the sending, by first MCPTT UE, a discovery message may specifically include:

determining, by an application layer entity of the first MCPTT UE, to send the discovery message, and sending the discovery message to a lower layer entity of the first MCPTT UE; and sending, by the lower layer entity of the first MCPTT UE, the discovery message by including the discovery message in the user plane data.

The discovery message is used to request to discover some other users or some users in another communications group that are around a user. The first user that uses the first MCPTT UE may use a trigger button on the application layer entity of the first MCPTT UE to trigger sending of the discovery message, or the first user may trigger the first MCPTT UE in another manner to send the discovery message, which is not limited in the present invention.

When the discovery message is sent as a control plane signaling message, the sending, by first MCPTT UE, a discovery message may specifically include:

determining, by a Prose Protocol layer entity of the first MCPTT UE, to send the discovery message, and sending the discovery message as the control plane signaling message.

The discovery message is used to request to discover some other users or some users in another communications group that are around a user. The first user that uses the first MCPTT UE may use a trigger button on the Prose Protocol layer entity of the first MCPTT UE to trigger sending of the discovery message, or the first user may trigger the first MCPTT UE in another manner to send the discovery message, which is not limited in the present invention.

Optionally, in this embodiment of the present invention, the first MCPTT UE may send the discovery message in a broadcast manner, so that any discovery target in the MCPTT system can receive the discovery message, and/or may acquire a group layer 2 address of a communications group, and send the discovery message to the group layer 2 address that is used as a target address, so that all users in the communications group except the first user can receive the discovery message, where a specific implementation manner for the first MCPTT UE to send the discovery message to the group layer 2 address that is used as the target address is as follows:

When the discovery target is the at least one target user, and a target user of the at least one target user and the first user are in a first communications group, the sending a discovery message may specifically include:

acquiring a group layer 2 address of the first communications group; and sending the discovery message to the group layer 2 address, so that all users in the first communications group except the first user receive the discovery message.

When the discovery target is the at least one communications group, and the first user is in a second communications group of the at least one communications group, the sending a discovery message may specifically include:

acquiring a group layer 2 address of the second communications group; and sending the discovery message to the group layer 2 address, so that all users in the second communications group except the first user receive the discovery message.

Optionally, in this embodiment of the present invention, the discovery message may further include: a layer 2 identifier of the first MCPTT UE and an application layer identifier of a user that uses the first MCPTT UE, where the layer 2 identifier of the first MCPTT UE may be an MAC layer identifier, such as a MAC layer address.

102: The first MCPTT UE receives a response message sent by second MCPTT UE, where the response message includes a layer 2 identifier of the second MCPTT UE and an application layer identifier of a user that uses the second MCPTT UE.

When the discovery target is the at least one target user, the second MCPTT UE is MCPTT UE currently used by any target user of the at least one target user; or when the discovery target is the at least one communications group, the second MCPTT UE is MCPTT UE currently used by a user in any communications group of the at least one communications group.

Optionally, in this embodiment of the present invention, the first MCPTT UE may receive a response message that is sent by at least one second MCPTT UE in a one-to-one (one-to-one) manner; or may receive a response message that is sent by at least one second MCPTT UE in a one-to-many manner.

Further, to ensure security in a discovery message transmission process, in this embodiment of the present invention, the application layer identifier information of the discovery target is encrypted information, and the discovery message may further include a security parameter, where the security parameter is used to enable the second MCPTT UE to acquire, after determining corresponding security information according to the security parameter, an application layer identifier of the discovery target in the discovery message and return the response message. Preferably, the security parameter may be a key identifier.

Further, before step 101, the method may further include:

acquiring, by the first MCPTT UE, an application layer identifier of the first user that uses the first MCPTT UE.

When the discovery message is an application layer message, and is included in user plane data, the acquiring, by the first MCPTT UE, an application layer identifier of the first user that uses the first MCPTT UE may be specifically: acquiring, by the application layer entity of the first MCPTT UE, from a database of the first MCPTT UE, the application layer identifier of the first user that uses the first MCPTT UE, where a correspondence between the user that uses the first MCPTT UE and an application layer identifier of the user is pre-stored in the database.

When the discovery message is a control plane signaling message, the acquiring, by the first MCPTT UE, an application layer identifier of the first user that uses the first MCPTT UE may be specifically: acquiring, by the Prose Protocol layer entity of the first MCPTT UE, from the application layer entity of the first MCPTT UE, the application layer identifier of the first user that uses the first MCPTT UE, where the application layer entity of the first MCPTT UE acquires, from the database of the first MCPTT UE, the application layer identifier of the first user that uses the first MCPTT UE, where a correspondence between a user that uses the first MCPTT UE and an application layer identifier of the user is pre-stored in the database.

It can be known from the foregoing that, this embodiment of the present invention provides a discovery method. First MCPTT UE sends a discovery message that includes identifier information of a discovery target, and receives a response message that is sent by at least one second MCPTT UE and that includes a layer 2 identifier of the second MCPTT UE and an application layer identifier of a user that uses the second MCPTT UE. The response message includes a layer 2 identifier of MCPTT UE and an application layer identifier of a user that uses the MCPTT UE, and therefore a transmit end not only can determine a layer 2 identifier of MCPTT UE used by a peer end, but also can further determine the user that uses the MCPTT UE; and then can accurately identify the peer end, and perform service communication in a Prose manner, which prevents an existing problem that a source user cannot identify a target user according to a response message returned by the target user, and therefore the source user cannot perform service communication with the target user in the Prose manner.

Embodiment 2

Figure 5:
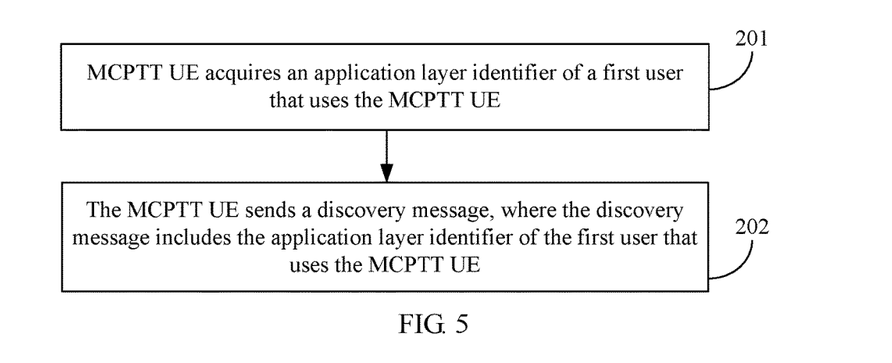
FIG. 5 is a flowchart of another discovery method according to an embodiment of the present invention.

FIG. 5 shows a flowchart of another discovery method according to an embodiment of the present invention. The discovery method is applied to MCPTT UE in a MCPTT system (for example, a public security system, or a firefighting system), so that some users or some communications groups discover a user that uses the MCPTT UE, where the MCPTT UE may be any user equipment in the MCPTT system, which is not limited herein. As shown in FIG. 5, the method may include:

201: MCPTT UE acquires an application layer identifier of a first user that uses the MCPTT UE.

The application layer identifier of the user is used to identify the user, and may be an external identifier defined in the 3GPP, for example, an MSISDN, where an ISDN is an integrated service digital network, and is short for the integrated service digital network, and a PSTN is a public switched telephone network, and is short for the public switched telephone network, or may be an SIP URI.

202: The MCPTT UE sends a discovery message, where the discovery message includes the application layer identifier of the first user that uses the MCPTT UE.

In the MCPTT system, direct communication may be performed in a one-to-many manner between different MCPTT UEs that are not in a connected state, a user plane channel may be established to perform service communication, or a message may be transmitted by using a control plane channel, where as shown in FIG. 3, a user plane includes six layers successively from the top down (a direction shown by the arrow in FIG. 3): an application layer, an IP ARP layer, a PDCP layer, a RLC layer, an MAC layer, and a PHY layer. The application layer may be referred to as a higher layer. One or more layers below the application layer may be referred to as lower layers. Generally, in the user plane, for a lower layer, all control plane messages or data of the application layer are included, as a payload, in a data packet. After initiating a message, the application layer transmits the message to a lower layer, the lower layer performs corresponding processing (such as encapsulation or forwarding), and sends the message to a lower layer of a peer device, and then the lower layer of the peer device performs corresponding processing (such as receiving or decapsulation), and transmits the message to the application layer. As shown in FIG. 4, the control plane may include three layers successively from the top down (a direction shown by the arrow in FIG. 4): a Prose Protocol layer, an MAC layer, and a PHY layer. On the control plane, two entities that are on a same layer and that are of devices may directly perform transmission by using control signaling; for example, control signaling is directly transmitted between a Prose Protocol layer of MCPTT UE 1 and a Prose Protocol layer of MCPTT UE 2. Therefore, in this embodiment of the present invention, the discovery message in step 201 may also be used as an application layer message, and sent by being included in user plane data, or may be sent as a control plane signaling message.

When the discovery message is an application layer message, and is sent by being included in user plane data, the sending, by the MCPTT UE, a discovery message may specifically include:

determining, by an application layer entity of the MCPTT UE, to send the discovery message, and sending the discovery message to a lower layer entity of the MCPTT UE; and sending, by the lower layer entity of the MCPTT UE, the discovery message by including the discovery message in the user plane data.

The discovery message is used to request some other users or some users in another communications group that are around a user that uses the MCPTT UE, to discover the user. The first user that uses the MCPTT UE may use a trigger button on the application layer entity of the MCPTT UE to trigger sending of the discovery message, or the first user may trigger the MCPTT UE in another manner to send the discovery message, which is not limited in the present invention.

When the discovery message is sent as a control plane signaling message, the sending, by the MCPTT UE, a discovery message may specifically include:

sending the discovery message as the control plane signaling message.

A discovery message is used to request some other users or some users in another communications group that are around a user that uses the MCPTT UE, to discover the user. The first user that uses the MCPTT UE may use a trigger button on the Prose Protocol layer entity of the MCPTT UE to trigger sending of the discovery message, or the first user may trigger the MCPTT UE in another manner to send the discovery message, which is not limited in the present invention.

Optionally, in this embodiment of the present invention, the discovery message may further include a layer 2 identifier of the MCPTT UE, where the layer 2 identifier of the MCPTT UE is an MAC layer identifier, such as an MAC address.

Optionally, in this embodiment of the present invention, the MCPTT UE may send the discovery message in a broadcast manner, so that all users in the MCPTT system except the first user can receive the discovery message; and/or may further acquire a group layer 2 address of a communications group to which the first user belongs, use the group layer 2 address as a target address, and send the discovery message to the target address, so that all users in the group except the first user can receive the discovery message, where the using the group layer 2 address as a target address, and sending the discovery message to the target address is specifically as follows:

acquiring a group layer 2 address of a first communications group to which the first user belongs; and sending the discovery message to the group layer 2 address, so that all users in the first communications group except the first user receive the discovery message.

The group layer 2 address of the first communications group may be a Media Access Control layer identifier of the first communications group, such as a MAC address.

Further, to ensure security in a discovery message transmission process, in this embodiment of the present invention, the application layer identifier of the first user is encrypted, and the discovery message further includes a security parameter, where the security parameter is used to enable another MCPTT UE in the first communications group except the MCPTT UE to acquire, after determining corresponding security information according to the security parameter, the application layer identifier of the first user that uses the MCPTT UE in the discovery message.

Optionally, in this embodiment of the present invention, when the discovery message is transmitted by using user plane data, the acquiring, by MCPTT UE, an application layer identifier of a first user that uses the MCPTT UE may be specifically: acquiring, by the application layer entity of the MCPTT UE, from a database of the MCPTT UE, the application layer identifier of the first user that uses the MCPTT UE, where a correspondence between the user that uses the MCPTT UE and an application layer identifier of the user is pre-stored in the database.

When the discovery message is sent as a control plane signaling message, the acquiring, by MCPTT UE, an application layer identifier of a first user that uses the MCPTT UE may be specifically: acquiring, by the Prose Protocol layer entity of the MCPTT UE, from the application layer entity of the MCPTT UE, the application layer identifier of the first user that uses the MCPTT UE, where the application layer entity of the MCPTT UE acquires, from the database of the MCPTT UE, the application layer identifier of the first user that uses the MCPTT UE, where a correspondence between the user that uses the MCPTT UE and an application layer identifier of the user is pre-stored in the database.

It can be known from the foregoing that, this embodiment of the present invention provides a discovery method. MCPTT UE sends a discovery message that includes an application layer identifier of a first user that uses the MCPTT UE. The discovery message includes the application layer identifier of the first user that uses the MCPTT UE, so that a receiving device can learn a user that uses the MCPTT UE, and then a peer end can accurately identify the user, and perform service communication in a Prose manner, which prevents an existing problem that a target user cannot identify a source user, and therefore a target user cannot perform service communication with the source user in the Prose manner.

Embodiment 3

Figure 6:
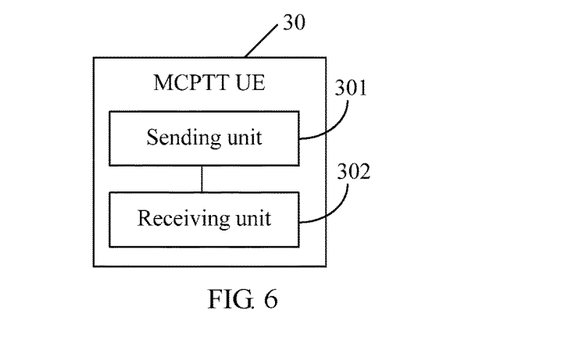
FIG. 6 is a structural diagram of MCPTT UE 30 according to an embodiment of the present invention.

FIG. 6 shows a structural diagram of MCPTT UE 30 according to an embodiment of the present invention. The MCPTT UE 30 is configured to execute the method in Embodiment 1. As shown in FIG. 6, the MCPTT UE 30 may include: a sending unit 301 and a receiving unit 302.

The sending unit 301 is configured to send a discovery message, where the discovery message includes application layer identifier information of a discovery target, and the discovery target is at least one target user or at least one communications group of a first user that uses the MCPTT UE 30.

The discovery target may be some target users or some communications groups determined and discovered by the first user that uses the MCPTT UE 30. The target user may be any user that uses MCPTT UE to acquire an MCPTT service, may be in a same communications group together with the first user that uses the MCPTT UE 30, or may be in a communications group that is different from that of the first user that uses the MCPTT UE 30, which is not limited herein. The application layer identifier information of the target user is used to identify the target user, may be an external identifier defined in the 3GPP, for example, aN MSISDN, where an ISDN is an integrated service digital network, and is short for the integrated service digital network, and a PSTN is a public switched telephone network, and is short for the public switched telephone network, or may be aN SIP URI. The communications group may be any communications group in the MCPTT system. Application layer identifier information of the communications group may be a group identifier of the communications group, or may be an application layer group identifier, and is used to identify a group name that is of the communications group and that is in the MCPTT system. For example, a firefighting department includes three communications groups: a communications group 1, a communications group 2, and a communications group 3, where a group identifier of the communications group 1 is an emergency group, a group identifier of the communications group 2 is a leader group, and a group identifier of the communications group 3 is a service group.

The receiving unit 302 is configured to receive a response message sent by second MCPTT UE, where the response message includes a layer 2 identifier of the second MCPTT UE and an application layer identifier of a user that uses the second MCPTT UE.

When the discovery target is the at least one target user, the second MCPTT UE is MCPTT UE currently used by any target user of the at least one target user; or when the discovery target is the at least one communications group, the second MCPTT UE is MCPTT UE currently used by a user in any communications group of the at least one communications group.

In the MCPTT system, direct communication may be performed in a one-to-many manner between different MCPTT UEs that are not in a connected state, a user plane channel may be established to perform service communication, or a message may be transmitted to each other by using a control plane, where as shown in FIG. 3, a user plane includes six layers successively from the top down (a direction shown by the arrow in FIG. 3): an application layer, an IP Address Resolution Protocol ARP layer, a PDCP layer, a RLC layer, an MAC layer, and a PHY layer. The application layer may be referred to as a higher layer. One or more layers below the application layer may be referred to as lower layers. Generally, in the user plane, for a lower layer, all control plane messages or data of the application layer are included, as a payload, in a data packet. After initiating a message, the application layer transmits the message to a lower layer, the lower layer performs corresponding processing (such as encapsulation or forwarding), and sends the message to a lower layer of a peer device, and then the lower layer of the peer device performs corresponding processing (such as receiving or decapsulation), and transmits the message to the application layer. As shown in FIG. 4, the control plane may include three layers successively from the top down (a direction shown by the arrow in FIG. 4): a Prose Protocol layer, an MAC layer, and a PHY layer. Therefore, in this embodiment of the present invention, the discovery message may also be used as an application layer message, and sent by being included in user plane data, or may be sent as a control plane signaling message.

When the discovery message is an application layer message, and is sent by being included in user plane data, the sending unit 301 is specifically configured to:

when an application layer entity of the MCPTT UE determines to send the discovery message, send the discovery message to a lower layer entity of the MCPTT UE, so that the lower layer entity of the MCPTT UE sends the discovery message by including the discovery message in the user plane data.

The discovery message is used to request to discover some other users or some users in another communications group that are around a user. The first user that uses the MCPTT UE 30 may use a trigger button on the application layer entity of the MCPTT UE to trigger sending of the discovery message, or the first user may trigger the MCPTT UE in another manner to send the discovery message, which is not limited in the present invention.

When the discovery message is sent as a control plane signaling message, the sending unit is specifically configured to:

after a Prose Protocol layer entity of the MCPTT UE determines to send the discovery message, send the discovery message as the control plane signaling message.

The discovery message is used to request to discover some other users or some users in another communications group that are around a user. The first user that uses the MCPTT UE 30 may use a trigger button on the Prose Protocol layer entity of the MCPTT UE to trigger sending of the discovery message, or the first user may trigger the MCPTT UE in another manner to send the discovery message, which is not limited in the present invention.

Optionally, in this embodiment of the present invention, the discovery message may further include: a layer 2 identifier of the MCPTT UE and an application layer identifier of a user that uses the MCPTT UE, where the layer 2 identifier of the MCPTT UE may be an MAC identifier, such as an MAC address.

Figure 6A:
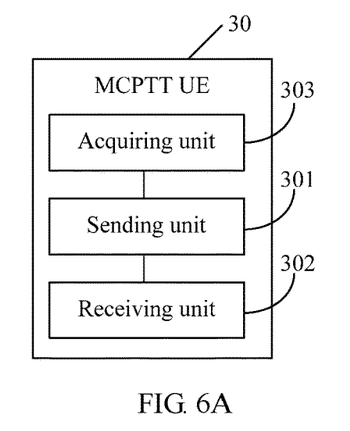
FIG. 6A is a structural diagram of MCPTT UE 30 according to an embodiment of the present invention.

Further, in this embodiment of the present invention, the sending unit 301 may send the discovery message in a broadcast manner, so that any discovery target in the MCPTT system can receive the discovery message, and/or may acquire a group layer 2 address of a communications group, and send the discovery message to the group layer 2 address that is used as a target address, so that all users in the communications group except the first user can receive the discovery message, where a specific implementation manner for the sending unit 301 to send the discovery message to the group layer 2 address that is used as the target address is as follows:

When the discovery target is the at least one target user, and a target user of the at least one target user and the first user are in a first communications group, as shown in FIG. 6A, the MCPTT UE may further include:

an acquiring unit 303, configured to acquire a group layer 2 address of the first communications group; and the sending unit 301 is specifically configured to send the discovery message to the group layer 2 address, so that all users in the first communications group except the first user receive the discovery message.

When the discovery target is the at least one communications group, and the first user is in a second communications group of the at least one communications group, the acquiring unit 303 is specifically configured to acquire a group layer 2 address of the second communications group; and the sending unit 301 is specifically configured to send the discovery message to the group layer 2 address, so that all users in the second communications group except the first user receive the discovery message.

The group layer 2 address may be a Media Access Control layer identifier of a communications group, such as a MAC address, and is used to identify a target communications group.

Further, in this embodiment of the present invention, the receiving unit 302 may be configured to receive a response message that is sent by at least one second MCPTT UE in a one-to-one manner; or may be configured to receive a response message that is sent by at least one second MCPTT UE in a one-to-many manner.

Further, to ensure security in a discovery message transmission process, the application layer identifier information of the discovery target is encrypted information, and the discovery message may further include a security parameter, where the security parameter is used to enable the second MCPTT UE to acquire, after determining corresponding security information according to the security parameter, an application layer identifier of the discovery target in the discovery message and return the response message. Preferably, the security parameter may be a key identifier.

Further, the acquiring unit 303 is further configured to: before the sending unit 301 sends the discovery message, acquire an application layer identifier of the first user that uses the MCPTT UE 30.

Optionally, when the discovery message is an application layer message, and is included in user plane data, the acquiring unit 303 may be located in the application layer entity of the MCPTT UE, and the acquiring, by the acquiring unit 303, an application layer identifier of the first user that uses the MCPTT UE 30 may be specifically: acquiring, from a database of the MCPTT UE, the application layer identifier of the first user that uses the MCPTT UE 30, where a correspondence between the user that uses the MCPTT UE and an application layer identifier of the user is pre-stored in the database.

When the discovery message is a control plane signaling message, the acquiring unit 303 may be located in the Prose Protocol layer entity of the MCPTT UE, and the acquiring, by the acquiring unit 303, an application layer identifier of the first user that uses the MCPTT UE 30 may be specifically: acquiring, from the application layer entity of the MCPTT UE, the application layer identifier of the first user that uses the MCPTT UE 30, where the application layer entity of the MCPTT UE acquires, from the database of the MCPTT UE, the application layer identifier of the first user that uses the MCPTT UE 30, where a correspondence between the user that uses the MCPTT UE and an application layer identifier of the user is pre-stored in the database.

It can be known from the foregoing that, this embodiment of the present invention provides MCPTT UE, to send a discovery message that includes identifier information of a discovery target, and receive a response message that is sent by at least one second MCPTT UE and that includes a layer 2 identifier of the second MCPTT UE and an application layer identifier of a user that uses the second MCPTT UE. The response message includes a layer 2 identifier of MCPTT UE and an application layer identifier of a user that uses the MCPTT UE, and therefore a transmit end not only can determine a layer 2 identifier of MCPTT UE used by a peer end, but also can further determine the user that uses the MCPTT UE; and then can accurately identify the peer end, and perform service communication in a Prose manner, which prevents an existing problem that a source user cannot identify a target user according to a response message returned by the target user, and therefore the source user cannot perform service communication with the target user in the Prose manner.

Embodiment 4

Figure 7:
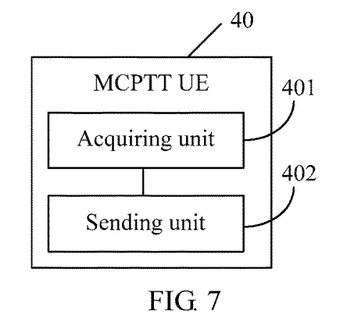
FIG. 7 is a structural diagram of MCPTT UE 40 according to an embodiment of the present invention.

FIG. 7 shows a structural diagram of MCPTT UE 40 according to an embodiment of the present invention. The MCPTT UE 40 is applied to the method in Embodiment 2. As shown in FIG. 7, the MCPTT UE 40 may include: an acquiring unit 401 and a sending unit 402.

The acquiring unit 401 is configured to acquire an application layer identifier of a first user that uses the MCPTT UE 40.

The application layer identifier of the user is used to identify the user, and may be an external identifier defined in the 3GPP, for example, an MSISDN, where an ISDN is an integrated service digital network, and is short for the integrated service digital network, and a PSTN is a public switched telephone network, and is short for the public switched telephone network, or may be an SIP URI.

The sending unit 402 is configured to: after the acquiring unit 401 acquires the application layer identifier of the first user that uses the MCPTT UE 40, send a discovery message, where the discovery message includes the application layer identifier of the first user that uses the MCPTT UE 40.

In the MCPTT system, direct communication may be performed in a one-to-many manner between different MCPTT UEs that are not in a connected state, a user plane channel may be established to perform service communication, or a message may be transmitted to each other by using a control plane, where as shown in FIG. 3, a user plane includes six layers successively from the top down (a direction shown by the arrow in FIG. 3): an application layer, an IP ARP layer, a PDCP layer, a RLC layer, an MAC layer, and a PHY layer. The application layer may be referred to as a higher layer. One or more layers below the application layer may be referred to as lower layers. Generally, in the user plane, for a lower layer, all control plane messages or data of the application layer are included, as a payload, in a data packet. After initiating a message, the application layer transmits the message to a lower layer, the lower layer performs corresponding processing (such as encapsulation or forwarding), and sends the message to a lower layer of a peer device, and then the lower layer of the peer device performs corresponding processing (such as receiving or decapsulation), and transmits the message to the application layer. As shown in FIG. 4, the control plane may include three layers successively from the top down (a direction shown by the arrow in FIG. 4): a Prose Protocol layer, an MAC layer, and a PHY layer. Therefore, in this embodiment of the present invention, the discovery message may be used as an application layer message, and sent by being included in user plane data, or may be sent as a control plane signaling message.

When the discovery message is an application layer message, and is sent by being included in user plane data, the sending unit 402 may be specifically configured to:

after an application layer entity of the MCPTT UE determines to send the discovery message, send the discovery message to a lower layer entity of the MCPTT UE, so that the lower layer entity of the MCPTT UE sends the discovery message by including the discovery message in the user plane data.

The discovery message is used to request some other users or some users in another communications group that are around a user that uses the MCPTT UE, to discover the user. The first user that uses the MCPTT UE 40 may use a trigger button on the application layer entity of the MCPTT UE to trigger sending of the discovery message, or the first user may trigger the MCPTT UE in another manner to send the discovery message, which is not limited in the present invention.

When the discovery message is sent as a control plane signaling message, the sending unit 402 may be specifically configured to:

after a Prose Protocol layer entity of the MCPTT UE determines the discovery message, send the discovery message as the control plane signaling message.

A discovery request message is used to request some other users or some users in another communications group that are around a user that uses the MCPTT UE, to discover the user. The first user that uses the MCPTT UE 40 may use a trigger button on the Prose Protocol layer entity of the MCPTT UE to trigger sending of the discovery message, or the first user may trigger the MCPTT UE in another manner to send the discovery message, which is not limited in the present invention.

Correspondingly, when the discovery message is transmitted by using user plane data, the acquiring unit 401 may be located in the application layer entity of the MCPTT UE, and the acquiring, by the acquiring unit 401, an application layer identifier of a first user that uses MCPTT UE 40 may be specifically: acquiring, from a database of the MCPTT UE 40, the application layer identifier of the first user that uses the MCPTT UE 40, where a correspondence between the user that uses the MCPTT UE and an application layer identifier of the user is pre-stored in the database.

When the discovery message is sent as a control plane signaling message, the acquiring, by the acquiring unit 401, an application layer identifier of a first user that uses MCPTT UE 40 may be specifically: acquiring, from the application layer entity of the MCPTT UE, the application layer identifier of the first user that uses the MCPTT UE 40, where the application layer entity of the MCPTT UE acquires, from the database of the MCPTT UE, the application layer identifier of the first user that uses the MCPTT UE 40, where a correspondence between the user that uses the MCPTT UE and an application layer identifier of the user is pre-stored in the database.

Further, in this embodiment of the present invention, the discovery message may further include a layer 2 identifier of the MCPTT UE, where the layer 2 identifier of the MCPTT UE is an MAC identifier, such as an MAC address.

Further, in this embodiment of the present invention, the sending unit 402 may be specifically configured to send the discovery message in a broadcast manner, so that all users in the MCPTT system can receive the discovery message; and/or may further acquire a group layer 2 address of a communications group to which the first user belongs, use the group layer 2 address as a target address, and send the discovery message to the target address, so that all users in the group can receive the discovery message, where the using, by the sending unit 402, the group layer 2 address as a target address, and sending the discovery message to the target address is specifically as follows:

the acquiring unit 401 being further configured to acquire a group layer 2 address of a first communications group to which the first user belongs; and the sending unit 402 being specifically configured to send the discovery message to the group layer 2 address, so that all users in the first communications group except the first user receive the discovery message.

The group layer 2 address of the first communications group may be a Media Access Control layer identifier of the first communications group, such as a MAC address.

Further, to ensure security in a discovery message transmission process, the application layer identifier of the first user is encrypted, and the discovery message further includes a security parameter, where the security parameter is used to enable another MCPTT UE in the first communications group except the MCPTT UE to acquire, after determining corresponding security information according to the security parameter, the application layer identifier of the first user that uses the MCPTT UE 40 in the discovery message.

It can be known from the foregoing that, this embodiment of the present invention provides MCPTT UE. The MCPTT UE sends a discovery message that includes an application layer identifier of a first user that uses the MCPTT UE 40. The discovery message includes the application layer identifier of the first user that uses the MCPTT UE 40, so that a receiving device can learn a user that uses the MCPTT UE, and then a peer end can accurately identify the user, and perform service communication in a Prose manner, which prevents an existing problem that a target user cannot identify a source user, and therefore a target user cannot perform service communication with the source user in the Prose manner.

Embodiment 5

Figure 8:
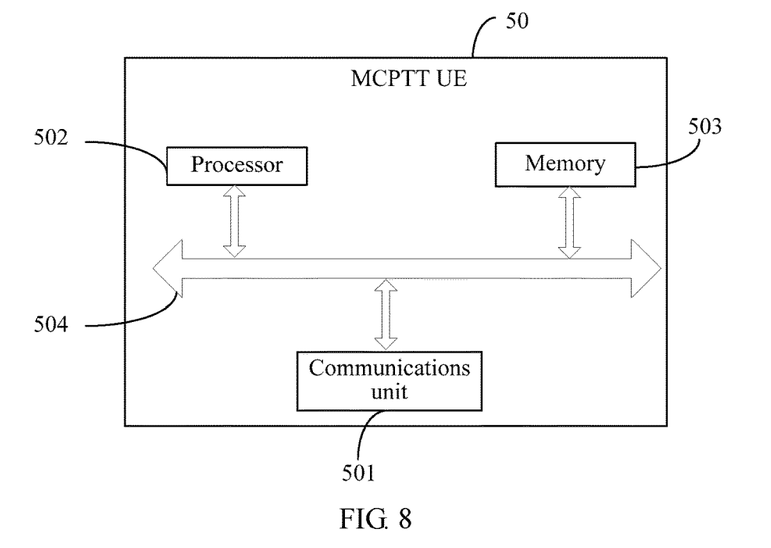
FIG. 8 is a structural diagram of MCPTT UE 50 according to an embodiment of the present invention.

FIG. 8 shows a structural diagram of MCPTT UE 50 according to an embodiment of the present invention. The MCPTT UE 50 is configured to execute the method in Embodiment 1. As shown in FIG. 8, the MCPTT UE 50 may include: a communications unit 501, a processor 502, a memory 503, and at least one communications bus 504 that is configured to implement connection and mutual communication between these devices.

The communications unit 501 is configured to perform data transmission with an external network element.

The processor 502 may be a central processing unit (CPU).

The memory 503 may be a volatile memory, such as a random-access memory (RAM); or a non-volatile memory, such as a read-only memory (ROM), a flash memory, a hard disk drive (HDD) or a solid-state drive (SSD); or a combination of the foregoing types of memories; and provides instructions and data for the processor 502.

The communications unit 501 is configured to send a discovery message, where the discovery message includes application layer identifier information of a discovery target, and the discovery target is at least one target user or at least one communications group of a first user that uses the MCPTT UE 50; and receive a response message sent by second MCPTT UE, where the response message includes a layer 2 identifier of the second MCPTT UE and an application layer identifier of a user that uses the second MCPTT UE.

The discovery target may be some target users or some communications groups determined and discovered by the first user that uses the MCPTT UE 50. The target user may be any user that uses MCPTT UE to acquire an MCPTT service, may be in a same communications group together with the first user that uses the MCPTT UE 50, or may be in a communications group that is different from that of the first user that uses the MCPTT UE 50, which is not limited herein. The application layer identifier information of the target user is used to identify the target user, may be an external identifier defined in the 3GPP, for example, an MSISDN, where an ISDN is an integrated service digital network, and is short for the integrated service digital network, and a PSTN is a public switched telephone network, and is short for the public switched telephone network, or may be an SIP URI. The communications group may be any communications group in the MCPTT system. Application layer identifier information of the communications group may be a group identifier of the communications group, or may be an application layer group identifier, and is used to identify a group name that is of the communications group and that is in the MCPTT system. For example, a firefighting department includes three communications groups: a communications group 1, a communications group 2, and a communications group 3, where a group identifier of the communications group 1 is an emergency group, a group identifier of the communications group 2 is a leader group, and a group identifier of the communications group 3 is a service group.

When the discovery target is the at least one target user, the second MCPTT UE is MCPTT UE currently used by any target user of the at least one target user; or when the discovery target is the at least one communications group, the second MCPTT UE is MCPTT UE currently used by a user in any communications group of the at least one communications group.

In the MCPTT system, direct communication may be performed in a one-to-many manner between different MCPTT UEs that are not in a connected state, a user plane channel may be established to perform service communication, or a message may be transmitted to each other by using a control plane, where as shown in FIG. 3, a user plane includes six layers successively from the top down (a direction shown by the arrow in FIG. 3): an application layer, an IP ARP layer, a PDCP layer, a RLC layer, an MAC layer, and a PHY layer. The application layer may be referred to as a higher layer. One or more layers below the application layer may be referred to as lower layers. Generally, in the user plane, for a lower layer, all control plane messages or data of the application layer are included, as a payload, in a data packet. After initiating a message, the application layer transmits the message to a lower layer, the lower layer performs corresponding processing (such as encapsulation or forwarding), and sends the message to a lower layer of a peer device, and then the lower layer of the peer device performs corresponding processing (such as receiving or decapsulation), and transmits the message to the application layer. As shown in FIG. 4, the control plane may include three layers successively from the top down (a direction shown by the arrow in FIG. 4): a Prose Protocol layer, an MAC layer, and a PHY layer. Therefore, in this embodiment of the present invention, the discovery message may also be used as an application layer message, and sent by being included in user plane data, or may be sent as a control plane signaling message.

When the discovery message is an application layer message, and is sent by being included in user plane data, the communications unit 501 is specifically configured to:

when an application layer entity of the MCPTT UE determines to send the discovery message, send the discovery message to a lower layer entity of the MCPTT UE, so that the lower layer entity of the MCPTT UE sends the discovery message by including the discovery message in the user plane data.

The discovery message is used to request to discover some other users or some users in another communications group that are around a user. The first user that uses the MCPTT UE 50 may use a trigger button on the application layer entity of the MCPTT UE to trigger sending of the discovery message, or the first user may trigger the MCPTT UE in another manner to send the discovery message, which is not limited in the present invention.

When the discovery message is sent as a control plane signaling message, the sending unit is specifically configured to:

after a Prose Protocol layer entity of the first MCPTT UE determines to send the discovery message, send the discovery message as the control plane signaling message.

The discovery message is used to request to discover some other users or some users in another communications group that are around a user. The first user that uses the MCPTT UE 50 may use a trigger button on the Prose Protocol layer entity of the MCPTT UE to trigger sending of the discovery message, or the first user may trigger the MCPTT UE in another manner to send the discovery message, which is not limited in the present invention.

Optionally, in this embodiment of the present invention, the discovery message may further include: a layer 2 identifier of the MCPTT UE and an application layer identifier of a user that uses the MCPTT UE, where the layer 2 identifier of the MCPTT UE may be an MAC layer identifier, such as an MAC layer address.

Further, in this embodiment of the present invention, the communications unit 501 may send the discovery message in a broadcast manner, so that any discovery target in the MCPTT system can receive the discovery message, and/or may acquire a group layer 2 address of a communications group, and send the discovery message to the group layer 2 address that is used as a target address, so that all users in the communications group can receive the discovery message, where a specific implementation manner for the communications unit 501 to send the discovery message to the group layer 2 address that is used as the target address is as follows:

When the discovery target is the at least one target user, and a target user of the at least one target user and the first user are in a first communications group, the processor 502 is configured to acquire a group layer 2 address of the first communications group; and the communications unit 501 is specifically configured to send the discovery message to the group layer 2 address, so that all users in the first communications group except the first user receive the discovery message.

When the discovery target is the at least one communications group, and the first user is in a second communications group of the at least one communications group, the processor 502 is specifically configured to acquire a group layer 2 address of the second communications group; and the communications unit 501 is specifically configured to send the discovery message to the group layer 2 address, so that all users in the second communications group except the first user receive the discovery message.

The group layer 2 address may be a Media Access Control layer identifier of a communications group, such as a MAC address, and is used to identify a target communications group.

Further, in this embodiment of the present invention, the communications unit 501 may be configured to receive a response message that is sent by at least one second MCPTT UE in a one-to-one manner; or may be configured to receive a response message that is sent by at least one second MCPTT UE in a one-to-many manner.

Further, to ensure security in a discovery message transmission process, the application layer identifier information of the discovery target is encrypted information, and the discovery message may further include a security parameter, where the security parameter is used to enable the second MCPTT UE to acquire, after determining corresponding security information according to the security parameter, an application layer identifier of the discovery target in the discovery message and return the response message. Preferably, the security parameter may be a key identifier.

Further, the processor 502 is further configured to: before the communications unit 501 sends the discovery message, acquire an application layer identifier of the first user that uses the MCPTT UE 50.

Optionally, when the discovery message is an application layer message, and is included in user plane data, the processor 502 may be located in the application layer entity of the MCPTT UE, and the acquiring, by the processor 502, an application layer identifier of the first user that uses the MCPTT UE 50 may be specifically: acquiring, from a database of the MCPTT UE, the application layer identifier of the first user that uses the MCPTT UE 50, where a correspondence between the user that uses the MCPTT UE and an application layer identifier of the user is pre-stored in the database.

When the discovery message is a control plane signaling message, the processor 502 may be located in the Prose Protocol layer entity of the MCPTT UE, and the acquiring, by the processor 502, an application layer identifier of the first user that uses the MCPTT UE 50 may be specifically: acquiring, from the application layer entity of the MCPTT UE, the application layer identifier of the first user that uses the MCPTT UE 50, where the application layer entity of the MCPTT UE acquires, from the database of the MCPTT UE, the application layer identifier of the first user that uses the MCPTT UE 50, where a correspondence between the user that uses the MCPTT UE and an application layer identifier of the user is pre-stored in the database.

It can be known from the foregoing that, this embodiment of the present invention provides MCPTT UE, to send a discovery message that includes identifier information of a discovery target, and receive a response message that is sent by at least one second MCPTT UE and that includes a layer 2 identifier of the second MCPTT UE and an application layer identifier of a user that uses the second MCPTT UE. The response message includes a layer 2 identifier of the second MCPTT UE and an application layer identifier of a user that uses the second MCPTT UE, and therefore a transmit end not only can determine a layer 2 identifier of MCPTT UE used by a peer end, but also can further determine the user that uses the MCPTT UE; and then can accurately identify the peer end, and perform service communication in a Prose manner, which prevents an existing problem that a source user cannot identify a target user according to a response message returned by the target user, and therefore the source user cannot perform service communication with the target user in the Prose manner.

Embodiment 6

Figure 9:
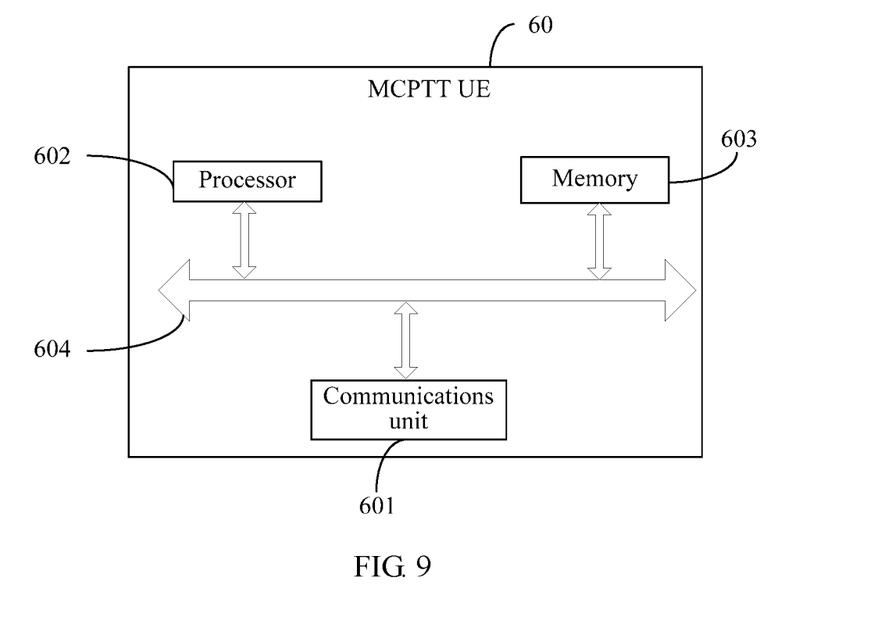
FIG. 9 is a structural diagram of MCPTT UE 60 according to an embodiment of the present invention.

FIG. 9 shows a structural diagram of MCPTT UE 60 according to an embodiment of the present invention. The MCPTT UE 60 is applied to the method in Embodiment 2. As shown in FIG. 9, the MCPTT UE 60 may include: a communications unit 601, a processor 602, a memory 603, and at least one communications bus 604 that is configured to implement connection and mutual communication between these devices.

The communications unit 601 is configured to perform data transmission with an external network element.

The processor 602 may be a central processing unit (CPU).

The memory 603 may be a volatile memory, such as a RAM; or a non-volatile memory, such as a ROM, a flash memory, an HDD or an SSD; or a combination of the foregoing types of memories; and provides instructions and data for the processor 602.

The processor 602 is configured to acquire an application layer identifier of a first user that uses the MCPTT UE 60.

The application layer identifier of the user is used to identify the user, and may be an external identifier defined in the 3GPP, for example, an MSISDN, where an ISDN is an integrated service digital network, and is short for the integrated service digital network, and a PSTN is a public switched telephone network, and is short for the public switched telephone network, or may be an SIP URI.

The communications unit 601 is configured to: after the processor 602 acquires the application layer identifier of the first user that uses the MCPTT UE 60, send a discovery message, where the discovery message includes the application layer identifier of the first user that uses the MCPTT UE 60.

In the MCPTT system, direct communication may be performed in a one-to-many manner between different MCPTT UEs that are not in a connected state, a user plane channel may be established to perform service communication, or a message may be transmitted to each other by using a control plane, where as shown in FIG. 3, a user plane includes six layers successively from the top down (a direction shown by the arrow in FIG. 3): an application layer, an IP ARP layer, a PDCP layer, a RLC layer, an MAC layer, and a PHY layer. The application layer may be referred to as a higher layer. One or more layers below the application layer may be referred to as lower layers. Generally, in the user plane, for a lower layer, all control plane messages or data of the application layer are included, as a payload, in a data packet. After initiating a message, the application layer transmits the message to a lower layer, the lower layer performs corresponding processing (such as encapsulation or forwarding), and sends the message to a lower layer of a peer device, and then the lower layer of the peer device performs corresponding processing (such as receiving or decapsulation), and transmits the message to the application layer. As shown in FIG. 4, the control plane may include three layers successively from the top down (a direction shown by the arrow in FIG. 4): a Prose Protocol layer, an MAC layer, and a PHY layer. Therefore, in this embodiment of the present invention, the discovery message may be used as an application layer message, and sent by being included in user plane data, or may be sent as a control plane signaling message.

When the discovery message is an application layer message, and is sent by being included in user plane data, the communications unit 601 may be specifically configured to:

after an application layer entity of the MCPTT UE determines to send the discovery message, send the discovery message to a lower layer entity of the MCPTT UE, so that the lower layer entity of the MCPTT UE sends the discovery message by including the discovery message in the user plane data.

The discovery message is used to request some other users or some users in another communications group that are around a user that uses the MCPTT UE, to discover the user. The first user that uses the MCPTT UE 60 may use a trigger button on the application layer entity of the MCPTT UE to trigger sending of the discovery message, or the first user may trigger the MCPTT UE in another manner to send the discovery message, which is not limited in the present invention.

When the discovery message is sent as a control plane signaling message, the communications unit 601 may be specifically configured to:

after a Prose Protocol layer entity of the MCPTT UE determines the discovery message, send the discovery message as the control plane signaling message.

A discovery request message is used to request some other users or some users in another communications group that are around a user that uses the MCPTT UE, to discover the user. The first user that uses the MCPTT UE 60 may use a trigger button on the Prose Protocol layer entity of the MCPTT UE to trigger sending of the discovery message, or the first user may trigger the MCPTT UE in another manner to send the discovery message, which is not limited in the present invention.

Correspondingly, when the discovery message is transmitted by using user plane data, the processor 602 may be located in the application layer entity of the MCPTT UE, and the acquiring, by the processor 602, an application layer identifier of a first user that uses MCPTT UE 60 may be specifically: acquiring, from a database of the MCPTT UE, the application layer identifier of the first user that uses the MCPTT UE 60, where a correspondence between the user that uses the MCPTT UE and an application layer identifier of the user is pre-stored in the database.

When the discovery message is sent as a control plane signaling message, the acquiring, by processor 602, an application layer identifier of a first user that uses MCPTT UE 60 may be specifically: acquiring, from the application layer entity of the MCPTT UE, the application layer identifier of the first user that uses the MCPTT UE 60, where the application layer entity of the MCPTT UE acquires, from the database of the MCPTT UE, the application layer identifier of the first user that uses the MCPTT UE 60, where a correspondence between the user that uses the MCPTT UE and an application layer identifier of the user is pre-stored in the database.

Further, in this embodiment of the present invention, the discovery message may further include a layer 2 identifier of the MCPTT UE, where the layer 2 identifier of the MCPTT UE is an MAC layer identifier, such as an MAC address.

Further, in this embodiment of the present invention, the communications unit 601 may be specifically configured to send the discovery message in a broadcast manner, so that all users in the MCPTT system can receive the discovery message; and/or may further acquire a group layer 2 address of a communications group to which the first user belongs, use the group layer 2 address as a target address, and send the discovery message to the target address, so that all users in the group can receive the discovery message, where the using, by the communications unit 601, the group layer 2 address as a target address, and sending the discovery message to the target address is specifically as follows:

the processor 602 being further configured to acquire a group layer 2 address of a first communications group to which the first user belongs; and the communications unit 601 being specifically configured to send the discovery message to the group layer 2 address, so that all users in the first communications group except the first user receive the discovery message.

The group layer 2 address of the first communications group may be a Media Access Control layer identifier of the first communications group, such as a MAC address.

Further, to ensure security in a discovery message transmission process, the application layer identifier of the first user is encrypted, and the discovery message further includes a security parameter, where the security parameter is used to enable another MCPTT UE in the first communications group except the MCPTT UE to acquire, after determining corresponding security information according to the security parameter, the application layer identifier of the first user that uses the MCPTT UE 60 in the discovery message.

It can be known from the foregoing that, this embodiment of the present invention provides MCPTT UE. The MCPTT UE sends a discovery message that includes an application layer identifier of a first user that uses the MCPTT UE 60. The discovery message includes the application layer identifier of the first user that uses the MCPTT UE 60, so that a receiving device can learn a user that uses the MCPTT UE 60, and then a peer end can accurately identify the user, and perform service communication in a Prose manner, which prevents an existing problem that a target user cannot identify a source user, and therefore a target user cannot perform service communication with the source user in the Prose manner.

It may be clearly understood by persons skilled in the art that, for the purpose of convenient and brief description, for a detailed working process of the foregoing unit and system, reference may be made to a corresponding process in the foregoing method embodiments, and details are not described herein.

In the several embodiments provided in the present application, it should be understood that the disclosed system, device, and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present invention. The foregoing storage medium includes any medium that can store program code, such as a USB flash drive, a removable hard disk, a ROM, a RAM, a magnetic disk, or an optical disc.

Persons of ordinary skill in the art may understand that all or a part of the steps of the methods in the embodiments may be implemented by a program instructing related hardware. The program may be stored in a computer readable storage medium. The storage medium may include: a read-only memory, a random-access memory, a magnetic disk, or an optical disc.

Finally, it should be noted that the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A discovery method, applied to first mission critical push to talk (MCPTT) user equipment (UE), the method comprising:

sending a discovery message, wherein the discovery message comprises application layer identifier information of a target user corresponding to a first user of the first MCPTT UE; and receiving a response message from a second MCPTT UE, wherein the response message comprises a layer 2 identifier of the second MCPTT UE and the application layer identifier of the target user, and wherein the second MCPTT UE is an MCPTT UE corresponding to the target user.

2. The discovery method according to claim 1, wherein the discovery message is an application layer message.

3. The discovery method according to claim 1, wherein the discovery message is a control plane signaling message of the first MCPTT UE.

4. The discovery method according to claim 1, wherein the application layer identifier information of the target user is encrypted information, and the discovery message further comprises a security parameter, wherein the security parameter is used for the second MCPTT UE:

acquiring, after determining corresponding security information according to the security parameter, the application layer identifier of the target user in the discovery message; and returning the response message.

5. The discovery method according to claim 1, wherein the target user and the first user are in a first communications group of at least one communications group, and the sending a discovery message comprises:

acquiring a group layer 2 address of the first communications group; and sending the discovery message to the group layer 2 address.

6. The discovery method according to claim 1, wherein the first user is in a second communications group of at least one communications group, and the sending a discovery message comprises:

acquiring a group layer 2 address of the second communications group; and sending the discovery message of the group layer 2 address.

7. The discovery method according to claim 1, wherein the discovery message further comprises:

a layer 2 identifier of the first MCPTT UE and an application layer identifier of the first user.

8. An apparatus, comprising a processor and a non-transitory storage medium storing executable instructions that when executed by the processor, cause the apparatus to:

send a discovery message, wherein the discovery message comprises application layer identifier information of a target user corresponding to a first user of a first MCPTT user equipment (UE); and receive a response message from a second MCPTT UE, wherein the response message comprises a layer 2 identifier of the second MCPTT UE and the application layer identifier of the target user, and wherein the second MCPTT UE is an MCPTT UE corresponding to the target user.

9. The apparatus according to claim 8, wherein the discovery message is a control plane signaling message of the first MCPTT UE.

10. The apparatus according to claim 8, wherein the application layer identifier information of the target user is encrypted information, and the discovery message further comprises a security parameter, wherein the security parameter is used for acquiring the application layer identifier of the target user in the discovery message.

11. The apparatus according to claim 8, wherein the target user and the first user are in a first communications group of at least one communications group, and wherein, when executed by the processor, the executable instructions further cause the apparatus to:

acquire a group layer 2 address of the first communications group; and send the discovery message to the group layer 2 address.

12. The apparatus according to claim 8, wherein the first user is in a second communications group of at least one communications group, and wherein, when executed by the processor, the executable instructions further cause the apparatus to:

acquire a group layer 2 address of the second communications group; and send the discovery message to the group layer 2 address.

13. The apparatus according to claim 8, wherein the discovery message further comprises:

a layer 2 identifier of the first MCPTT UE and an application layer identifier of the first user.

14. The apparatus according to claim 7, wherein the discovery message is an application layer message.

15. A non-transitory computer-readable medium storing processor executable instructions for performing a discovery method applied to first mission critical push to talk (MCPTT) user equipment (UE), which, when executed by a processor of an apparatus, cause the apparatus to:

send a discovery message, wherein the discovery message comprises application layer information of a target user corresponding to a first user of the first MCPTT UE; and receive a response message from a second MCPTT UE, wherein the response message comprises a layer 2 identifier of the second MCPTT UE and the application layer identifier of the target user, and wherein the second MCPTT UE is an MCPTT UE corresponding to the target user.

16. The non-transitory computer-readable medium according to claim 15, wherein the discovery message is a control plane signaling message of the MCPTT UE.

17. The non-transitory computer-readable medium according to claim 15, wherein the target user and the first user are in a first communications group of at least one communications group, and wherein, when executed by the processor, the executable instructions further cause the apparatus to:

acquire a group layer 2 address of the first communications group; and send the discovery message to the group layer 2 address.

18. The non-transitory computer-readable medium according to claim 15, wherein the application layer identifier of the first user is encrypted, and the discovery message further comprises a security parameter, wherein the security parameter is used for acquiring the application layer identifier of the first user that uses the MCPTT UE in the discovery message.

19. The non-transitory computer-readable medium according to claim 15, wherein the discovery message further comprises:

a layer 2 identifier of the MCPTT UE.

20. The non-transitory computer-readable medium according to claim 15, wherein the discovery message is an application layer message.

* * * * *